(No Model.)
P. LINCOLN.
VEHICLE WHEEL.
No. 254,145.  Patented Feb. 28, 1882.
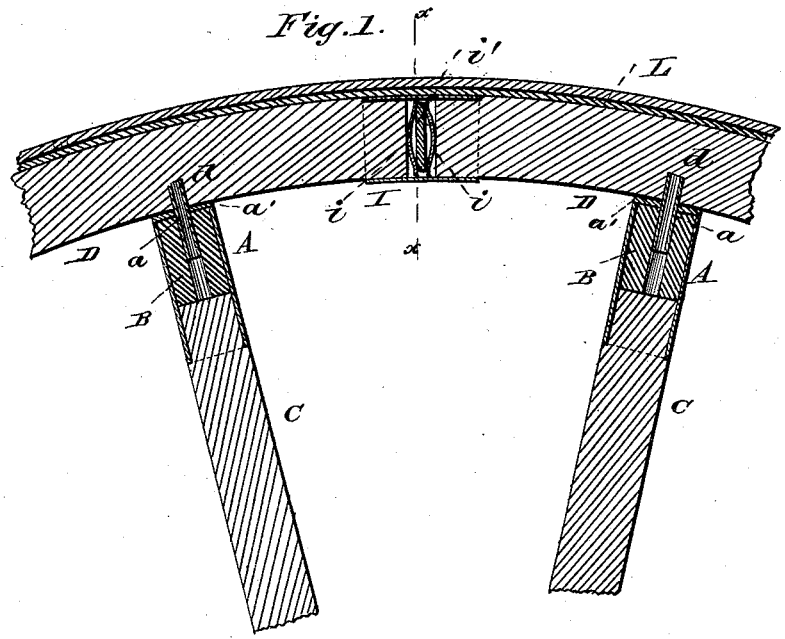
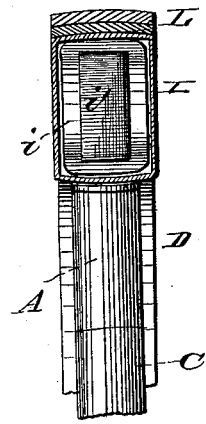
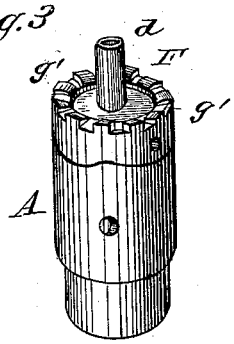
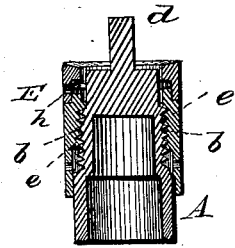
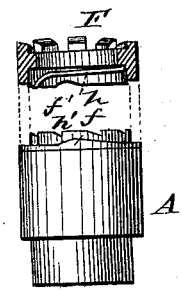
WITNESSES
INVENTOR

UNITED STATES PATENT OFFICE.

PERIES LINCOLN, OF COLDWATER, MICHIGAN.

VEHICLE-WHEEL.

SPECIFICATION forming part of Letters Patent No. 254,145, dated February 28, 1882.

Application filed September 24, 1881. (No model.)

*To all whom it may concern:*

Be it known that I, PERIES LINCOLN, a citizen of the United States, residing at Coldwater, in the county of Branch and State of Michigan, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in vehicle-wheels, and more particularly to improvements in connecting the sections of the fellies together, in adjustably connecting the outer ends of the spokes with the fellies, and in the arrangement of a rubber band between the tire and felly, whereby the several parts composing the wheel are adapted to be adjusted to conform to the usual expansion and contraction due to the various conditions of the weather; and this invention consists in novel features of construction and combination and arrangement of parts, all as will be hereinafter fully described, and particularly designated in the claims.

Referring to the accompanying drawings, Figure 1 represents a section of a wheel with my improvements applied thereto; Fig. 2, a cross-section through the line $x$ $x$ of Fig. 1; Figs. 3, 4, and 5, detached views in perspective and sections of my improved device for connecting the outer ends of the spokes with the fellies.

In the drawings, A represents a thimble, having an interior rubber block, B, against which the end of the spoke C rests when inserted in thimble. The outer end of said thimble is made concave in cross-section, so as to conform to the surface of the felly D, and is provided with a stem, $a$, which fits into a hole, $d$, partially bored through the felly for its reception, said stem being provided with a rubber washer, $a'$, fitting between the felly and outer end of thimble.

The thimble A is provided on its exterior surface with a screw-threaded portion, $b$, for the reception of the band E, having an interior screw-threaded portion, $e$, by which said parts are adjustably secured together. The outer and exterior end, $e'$, of the band E is provided with a series of inclined planes or cone-shaped edges, $f$, adapted to engage a similar series, $f'$, on the inner end of a ring or dog, F, fitting over the outer portion, $g$, of the thimble A. This ring or dog F is provided with teeth $g'$ on its outer end, which engage with the inner face of felly, and a pawl, $h$, on its inner face to engage the ratchet-teeth $h'$, formed on the end of the projecting portion $h^2$ of the band E, whereby said band is held in any desired position to which it may be adjusted on the thimble A for lengthening or shortening the spoke.

By means of the inclined planes or cone-shaped edges $f f'$ of the parts E F the band E can be turned in either direction, it only being necessary to throw the pawl $h$ out of the teeth $h'$ of the band E by inserting a key through the ring or dog F at the opening shown in dotted lines, Fig. 4.

I represents a band by which the fellies are connected together, and $i$ $i$ springs arranged in said band I between the ends of fellies, and $i'$ rubber spring to go between the leaves of the springs $i$ $i$.

The rubber block B in the thimble, and washer $a'$ between the thimble and felly, and also the springs in the band I between the ends of the fellies, are to allow the wood-work to press on the several springs when swelled in wet weather, and prevent the wearing of the wood where the thimble and spokes and fellies come together, and also to hold the fellies up to the tire J when it is expanded by hot and dry weather, and thereby prevent the tire from becoming loose.

The thimbles A can be used without the device for adjusting them relatively to the fellies.

By means of the adjusting devices constructed as described the wheel can be tightened and loosened, the felly being round to fit into the tire, which is made slightly concave in cross-section for that purpose. With my improvements the tire can be set cold, and a rubber band, L, inserted between felly and tire will assist to hold the wheel in place in wet, hot, or dry weather.

Wheels constructed in the above-described manner will be valuable for army and other uses, as they could be repaired without the aid of blacksmiths.

Further description of the operation of my improvements and their advantages is deemed unnecessary, they being obvious from the foregoing to persons skilled in the art.

Having thus fully described my invention, what I desire to claim as new and as of my invention is—

1. The combination, with the spoke C, felly D, and thimble A, having exterior threaded portion, $b$, of the screw-threaded band, E, having inclined planes or cone-shaped edges $f$, and the ring or dog F, having similar inclined planes or cone-shaped edges, $f'$, substantially as and for the purpose herein shown and described.

2. The combination, with the spoke C, felly D, and thimble A, having exterior threaded portion, $b$, of the screw-threaded band E, having the ratchet-teeth $h'$ and inclined planes or cone-shaped edges $f$, and the ring or dog F, having similar inclined planes or cone-shaped edges, $f'$, interior pawl, $h$, and teeth $g'$, substantially as and for the purpose herein shown and described.

3. The combination, with the ends of the fellies and connecting-band I, of the intermediate spring or springs, $i\ i$, substantially as and for the purpose herein shown and described.

4. The combination, with the ends of the fellies and connecting-band I, of the springs $i\ i$ and intermediate spring, $i'$, substantially as and for the purpose herein shown and described.

In testimony whereof I affix my signature in presence of two witnesses.

PERIES LINCOLN.

Witnesses:
E. M. WHALEN,
F. A. FISK.